(12) United States Patent
Andersson et al.

(10) Patent No.: US 7,486,615 B2
(45) Date of Patent: Feb. 3, 2009

(54) NETWORK DATA ROUTING PROTECTION CYCLES FOR AUTOMATIC PROTECTION SWITCHING

(75) Inventors: Loa Andersson, Alvsjo (SE); Kent Felske, Kanata (CA); Guo-Qiang Wang, Nepean (CA)

(73) Assignee: Nortel Network Limited, St. Laurent, Quebec (CA)

( * ) Notice: Subject to any disclaimer, the term of this patent is extended or adjusted under 35 U.S.C. 154(b) by 867 days.

(21) Appl. No.: 10/351,780

(22) Filed: Jan. 27, 2003

(65) Prior Publication Data

US 2003/0152025 A1    Aug. 14, 2003

(51) Int. Cl.
*G06F 11/00*    (2006.01)
*H04L 12/54*    (2006.01)

(52) U.S. Cl. .................. 370/225; 370/220; 370/428; 370/467; 340/825.1

(58) Field of Classification Search .............. 370/216, 370/220, 225–228, 241–244, 248, 250, 456, 370/467, 428, 474; 340/825.1, 827
See application file for complete search history.

(56) References Cited

U.S. PATENT DOCUMENTS 5,173,689 A * 12/1992 Kusano ............... 370/225
5,870,382 A * 2/1999 Tounai et al. ......... 370/220
6,301,223 B1 * 10/2001 Hrastar et al. ........ 370/227

* cited by examiner

*Primary Examiner*—Afsar M. Qureshi
(74) *Attorney, Agent, or Firm*—Anderson Gorecki & Manaras LLP

(57) ABSTRACT

A computer network processes data packets in the event of a network link failure. The network includes a plurality of routers that deliver data packets to the network via a plurality of links. At least one router includes a protection cycle manager. The protection cycle manager has a protection cycle packet identifier and a protection cycle packet processor. The protection cycle packet identifier identifies, as protection cycle packets, data packets having a specific protection cycle format. The protection cycle packet processor processes protection cycle packets to determine whether the packet destination corresponds to the routing node, and if the packet destination corresponds to the routing node, the protection cycle packet is treated by the routing node as a data packet received from the packet source via the failed link. Otherwise, if the packet destination does not correspond to the routing node, the protection cycle packet is sent to a protection cycle node for the routing node.

25 Claims, 3 Drawing Sheets

ND DATA ROUTING PROTECTION
NETWORK DATA ROUTING PROTECTION CYCLES FOR AUTOMATIC PROTECTION SWITCHING

TECHNICAL FIELD

The present invention relates to computer networks, and more specifically to a computer network that provides automatic protection switching to reroute data packets in the event of a network link failure.

BACKGROUND ART

In an Internet Protocol (IP) based computer network, data routing protocols such as Open Shortest Path First (OSPF), Intermediate System-Intermediate System (IS-IS), and Routing Information Protocol (RIP) are used to determine the path that data packets travel through the network. When a link between two network routers fails, the routing protocols are used to advertise the failure throughout the network. Most routers can detect a local link failure relatively quickly, but it takes the network as a whole a much longer time to converge. This convergence time is typically on the order of 10-60 seconds depending on the routing protocol and the size of the network. Eventually, all of the involved routers learn of the link failure and compute new routes for data packets to affected destinations. Once all the routers converge on a new set of routes, data packet forwarding proceeds normally. While the network is converging after a link fails, transient loops can occur which consume valuable bandwidth. Loop prevention algorithms have been proposed to eliminate such transient loops. When using these algorithms, routes are pinned until the network has converged and the new routes have been proven to be loop-free. Loop prevention algorithms have the advantage that data packets flowing on unaffected routes are not disrupted while transient loops are eliminated. The main drawback of loop prevention algorithms is that data packets directed out of a failed link get lost, or "black holed," during the convergence. Loop prevention algorithms also extend the convergence time somewhat while new routes are being verified to be loop-free.

SUMMARY OF THE INVENTION

A preferred embodiment of the present invention includes an apparatus and method for processing data packets in the event of a link failure of a routing node that delivers data packets to a data network via a plurality of links. A protection cycle manager includes a protection cycle packet identifier and a protection cycle packet processor. The packet identifier identifies, as protection cycle packets, data packets having a specific protection cycle format that includes a packet source and a packet destination. The processor processes each protection cycle packet to determine whether the packet destination corresponds to the routing node, and if the packet destination corresponds to the routing node, the protection cycle packet is treated by the routing node as a data packet received from the packet source via the failed link. Otherwise, if the packet destination does not correspond to the routing node, the protection cycle packet is sent to a protection cycle node for the routing node.

A further embodiment may include a protection cycle packeter, that, in response to failure of a link for the routing node,, converts affected data packets routed over the failed link into protection cycle packets in the specific protection cycle format. The protection cycle manager may further advertise a link failure to the network using a routing protocol. The specific protection cycle format may include a label stack based on Multi-Protocol Label Switching (MPLS) which may include labels for the packet source and the packet destination. The protection cycle node may be a next node on a Label Switched Path (LSP), in which case, the LSP may be based on network topology information which may be derived from a network protocol.

A preferred embodiment also includes a data router that delivers data packets to a data network via a plurality of links, the router processing data packets in the event of a link failure. The router includes a data interface for data packets to enter and exit the router, and a protection cycle manager. The protection cycle manager includes a protection cycle packet identifier and a protection cycle processor. The packet identifier identifies, as protection cycle packets, data packets having a specific protection cycle format that includes a packet source and a packet destination. The processor processes protection cycle packets to determine whether the packet destination corresponds to the routing node, and: (i) if the packet destination corresponds to the router, the protection cycle packet is treated by the router as a data packet received from the packet source via the failed link, and, (ii) if the packet destination does not correspond to the routing node, the protection cycle packets are sent to a protection cycle node for the router.

Another preferred embodiment includes a computer network having a plurality of data packet streams. The network includes a plurality of subnetworks, each subnetwork having at least one application that generates a stream of data packets for transmission over the computer network, and a plurality of routers that deliver data packets to the network via a plurality of links. At least one router processes data packets in the event of a link failure. The at least one router includes a plurality of data interfaces for streams of data packets to enter and exit the at least one router, and a protection cycle manager having a protection cycle packet identifier and a protection cycle processor. The packet identifier identifies, as protection cycle packets, data packets having a specific protection cycle format that includes a packet source and a packet destination. The processor processes protection cycle packets to determine whether the packet destination corresponds to the routing node, and: (i) if the packet destination corresponds to the at least one router, the protection cycle packet is treated by the at least one router as a data packet received from the packet source via the failed link, and, (ii) if the packet destination does not correspond to the routing node, the protection cycle packets are sent to a protection cycle node for the at least one router.

A preferred embodiment includes a computer program product for use on a computer system for processing data packets in the event of a link failure of a routing node that delivers data packets to a data network via a plurality of links. The computer program product comprises a computer-usable medium having computer-readable program code thereon. The computer readable program code includes program code for identifying, as protection cycle packets, data packets having a specific protection cycle format that includes a packet source and a packet destination. There is also program code for processing protection cycle packets to determine whether the packet destination corresponds to the routing node, and: (i) if the packet destination corresponds to the routing node, the protection cycle packet is treated by the routing node as a data packet received from the packet source via the failed link, and, (ii) if the packet destination does not correspond to the routing node, the protection cycle packets are sent to a protection cycle node for the routing node.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

A preferred embodiment of the present invention uses Multi-Protocol Label Switching (MPLS) with explicit routing to establish an MPLS layer protection cycle (p-cycle) that provides automatic protection switching to reroute data packets in the event of a network link failure. An MPLS Label Switched Path (LSP) tunnel passes through the end points of the link that will be protected. The LSP tunnel established in this way forms an MPLS p-cycle through which failed-link packets are directed. A given p-cycle may protect one or multiple links. In a preferred embodiment, a standard multi-layered MPLS label stack is used in the p-cycle. In other embodiments, a p-cycle may be implemented in another protocol other than MPLS.

The p-cycle may be configured by hand, or automatically established using network link state and topology information derived from a routing protocol, such as Open Shortest Path First (OSPF). Various algorithms may be used to automatically compute the specific structure of a given p-cycle. A preferred embodiment uses a network management application for this purpose since the p-cycle will not follow an optimal path. When a p-cycle is bi-directional, a bandwidth protection mechanism may be implemented so that some of the p-cycle traffic goes one way, and the rest the other way.

A preferred embodiment uses a diffusion-based loop prevention algorithm as is known in the art to detect when the network has converged so that it is safe to switch to the new routed path. Such diffusion algorithms are discussed, for example, in Garcia-Lunes-Aceves, J. J., "Loop-Free Routing Using Diffusing Computations," *IEEE/ACM Transactions on Networking*, vol. 1, no. 1, 1993, pp. 130-141, which is hereby incorporated herein by reference. Using p-cycles with a loop prevention algorithm allows for uninterrupted service in the event of a link failure without black holing of packets on the failed link.

Figure 1:
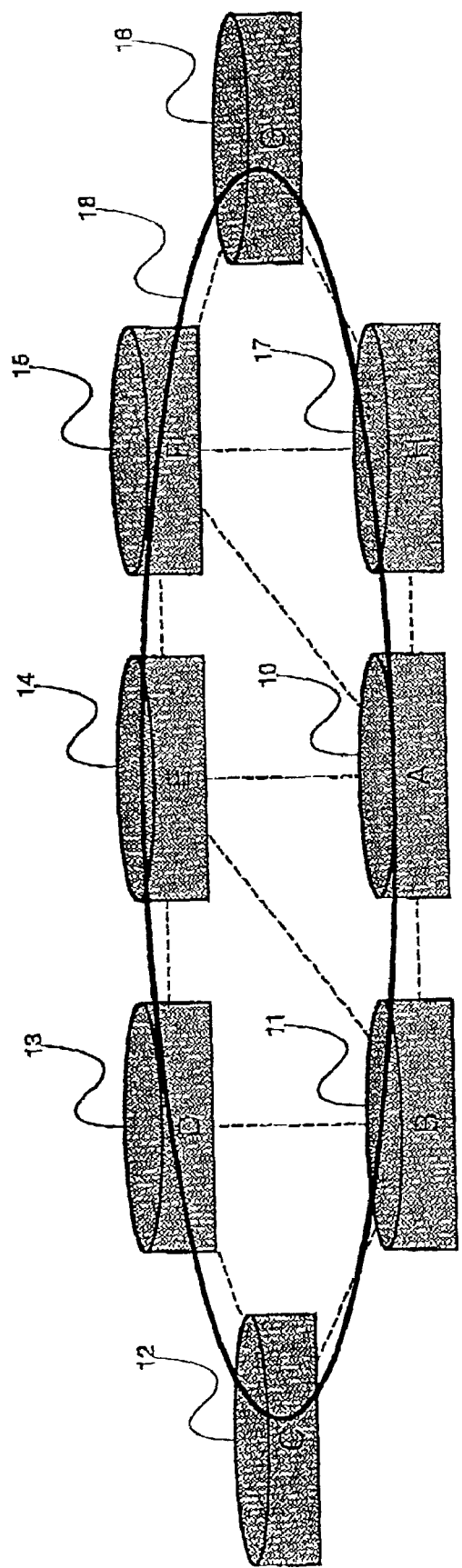
FIG. 1 is an illustration of a computer network which uses MPLS p-cycle automatic protection switching according to a preferred embodiment.

FIG. 1 is an illustration of a computer network using a preferred embodiment of the present invention for MPLS p-cycle automatic protection switching. In FIG. 1, network nodes A 10 through H 17 are normally linked via the dashed lines to route data packets from node to node. In the network segment shown, the normal network links between A and E, A and F, B and D, B and E, and H and F are also protected by a p-cycle 18. The p-cycle 18 forms a loop through the network so that a packet sent through the p-cycle will eventually come back to its origination node if not taken out of the p-cycle by one of the nodes it passes through. In FIG. 1, LSP p-cycle 18 traverses the network segment from node A 10 to B 11 to C 12 . . . to G 16 to H 17 and back to A 10.

Only one p-cycle 18 is shown in FIG. 1. In practice, a p-cycle is established for every set of links to be protected. A preferred embodiment can operate successfully in any arbitrary network topology. It should be noted, however, that to realize full link-level protection, for every two neighbors A and B connected by link L in the network, another network path between A and B must exist that does not include L.

Various options may be employed with respect to network-level encapsulation on the original link. For example, the original network-layer encapsulation (e.g., IP) may be tunneled in the p-cycle LSP. If MPLS is being used on the original link, then the labeled packet may be tunneled on the backup link using MPLS label stacking. Multiple independent link failures may be tolerated using multiple layers of tunneling.

The router for each node monitors its own local links. When a link failure is detected, the router for an affected node quickly routes the data packet traffic over to the p-cycle 18. Then, the network routing protocol advertises the link failure so that the network can be re-routed without the failed link, and a loop-prevention mechanism determines that the re-routed network is loop-free. Packet traffic may then be switched to the re-routed network and new p-cycles recalculated as necessary.

Figure 2:
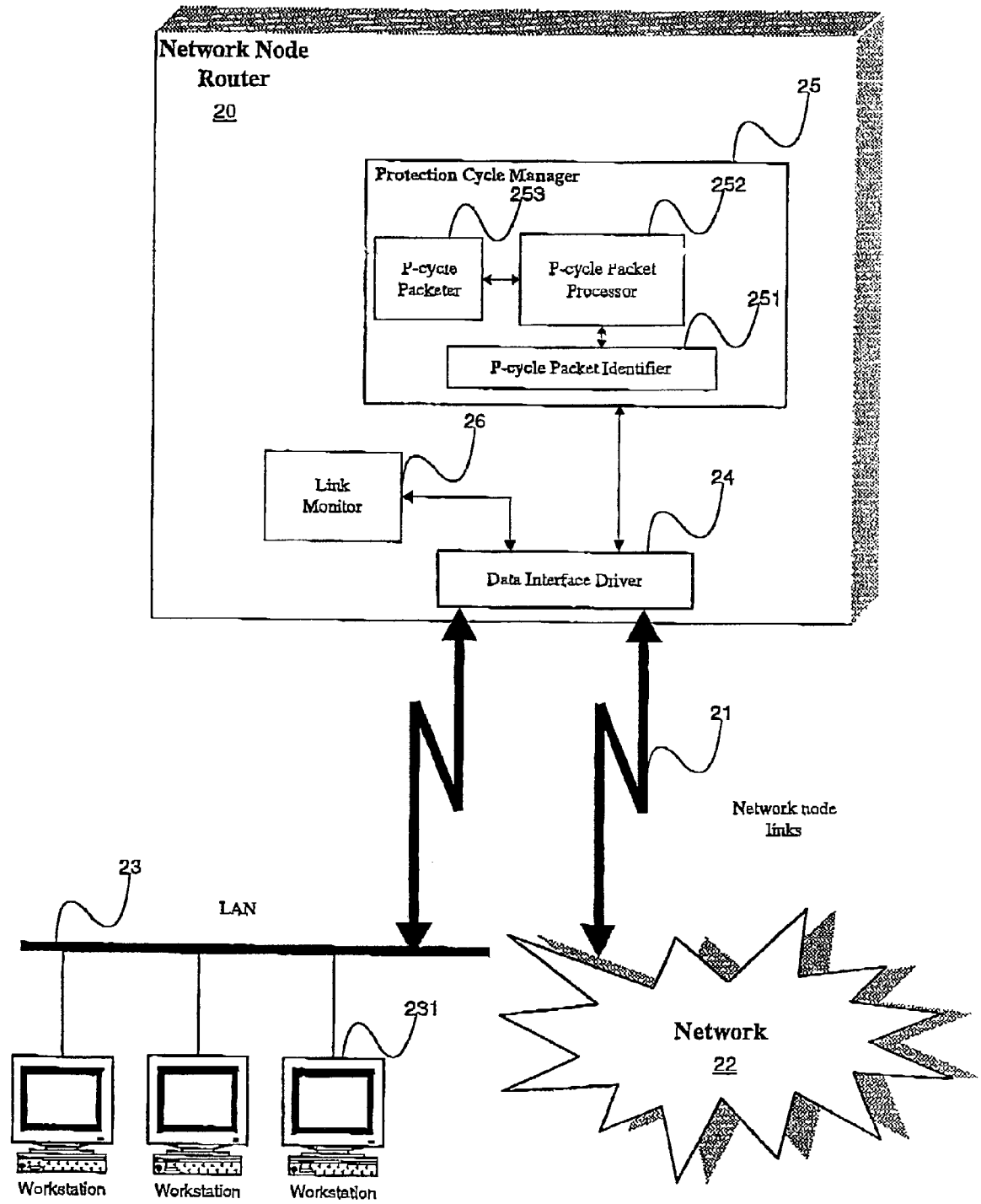
FIG. 2 is an illustration of a network node router which supports p-cycles according to a preferred embodiment.

FIG. 2 is an illustration of a network node router which supports p-cycles according to a preferred embodiment. Network node router 20 is a part of a computer network 22 of routers in mutual communication via a plurality of network node data links 21. Router 20 also serves to connect one or more local area networks (LANs) 23 having one or more workstations 231. Data packets enter and exit the router 20 as controlled by a data interface driver 24 which is connected to the network node links 21.

Figure 3:
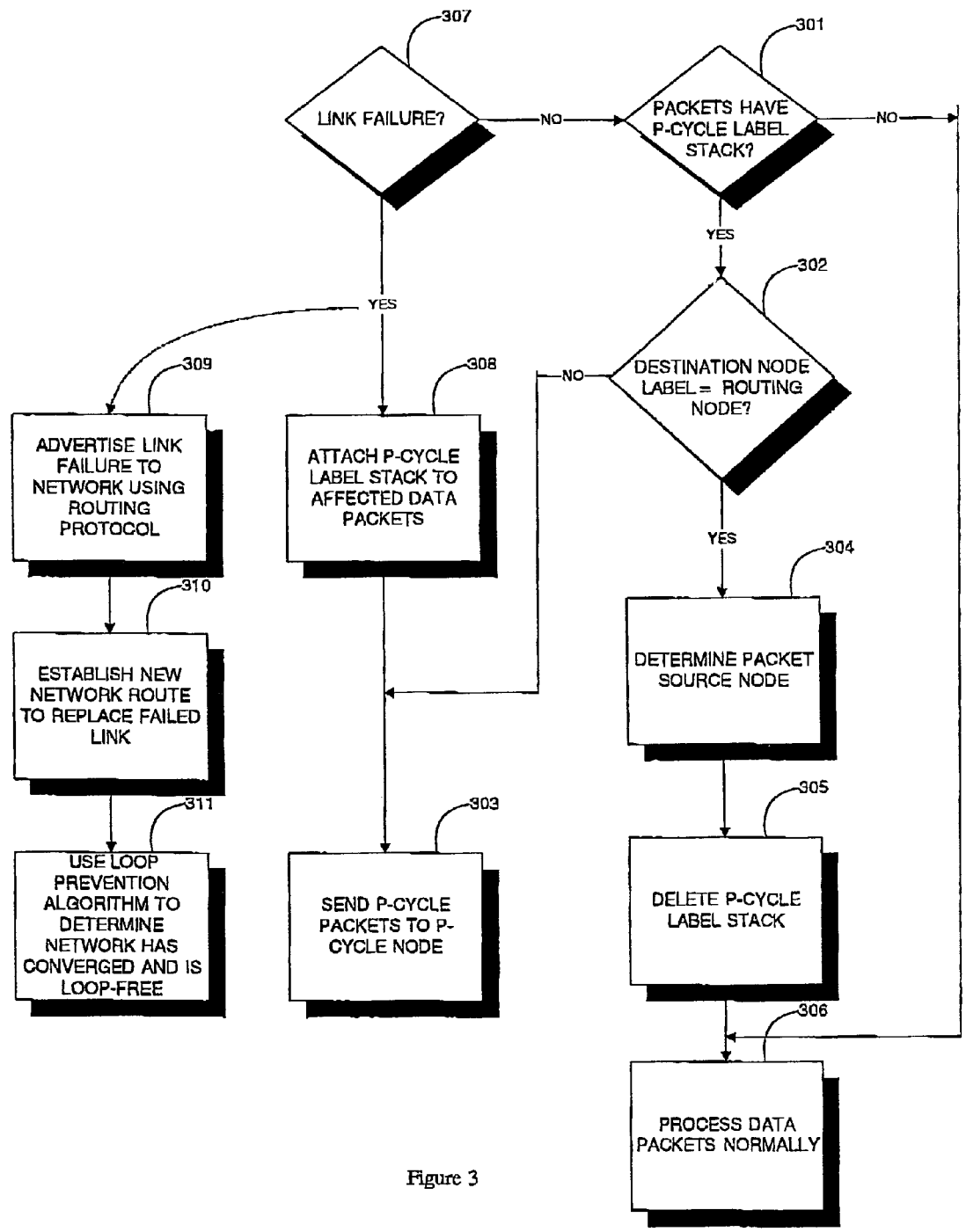
FIG. 3 is a flow chart illustration of the logical steps in a method of providing automatic protection switching according to a preferred embodiment.

FIG. 3 is a flow chart illustration of the logical steps in a corresponding method of providing automatic protection switching according to a preferred embodiment. A protection cycle manager 25 includes a p-cycle packet identifier 251 that, in step 301, identifies as p-cycle packets, data packets that have a p-cycle label stack, which, in a preferred embodiment, is a standard MPLS label stack. In such an embodiment, the top label in the stack indicates the next node in the p-cycle. The next label on the stack is the identity of the destination node that ultimately receives the packet, the third label in the stack is the identity of the node creating the label stack. Identified p-cycle packets are processed by p-cycle packet processor 252 which, in step 302, pops the topmost label off the label stack and checks the next label to see if the router node's own identity is in the destination node position in the label stack. If not, the label for the next p-cycle node is pushed onto the stack and the packet is sent by the data interface driver 24 via the node link 21 to the next node on the p-cycle, step 303. If, in step 302, the router node's own identity is carried in the destination node position in the label stack, the source node label in the label stack is checked to determine which network link the packet normally would have used, step 304. The p-cycle label stack is then deleted, step 305, and thereafter, the packet is treated as if it had been received via the normal network link 21 from the source node, step 306.

In a preferred embodiment, the network node router also includes a network link monitor 26 in communication with the data interface driver 24. When the link monitor 26 detects a failed link, step 307, protection cycle packeter 253 attaches to affected data packets a p-cycle label stack having appropriate labels for source node, destination node, and p-cycle node, step 308, and the p-cycle packets are then sent to the p-cycle node for that router, step 303. A link failure also is advertised to the network using the routing protocol, step 309.

A new network route is then established to replace the failed link, step 310, and a loop prevention algorithm is used to determine that the new network routes have converged and are loop-free, step 311.

Preferred embodiments of the invention, or portions thereof (e.g., the p-cycle packet processor 252, p-cycle packet identifier 251, link monitor 26, etc.), may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. Apparatus comprising:
   a first MPLS router being capable of receiving packets from a secondary LSP, the packets being sent to the first MPLS router from a second MPLS router that forwards packets over the secondary LSP in response to an event indicating that the secondary LSP should be used instead of a primary LSP;
   the first MPLS router being capable of forwarding the packets on the secondary LSP if the first MPLS router is not located at the termination point of the secondary LSP, and being capable of forwarding the packets on the primary path if the first MPLS router is located at the termination point of the secondary LSP.

2. The apparatus of claim 1 wherein the second MPLS router adds a label to packets being forwarded over the secondary LSP, and wherein the first MPLS router is capable of examining the label to identify received packets as being forwarded over the secondary LSP.

3. The apparatus of claim 2 wherein the second MPLS router adds a second label to packets being forwarded over the secondary LSP, and wherein the first MPLS router is capable of examining the second label to determine whether the first MPLS router is located at the termination point of the secondary LSP.

4. The apparatus of claim 2 wherein the second MPLS router adds another label to packets being forwarded over the secondary LSP, and wherein the first MPLS router examines the label to ascertain how to forward the packets over the primary LSP.

5. The apparatus of claim 1 wherein the second MPLS router adds a plurality of labels to packets being forwarded over the secondary LSP, the plurality of labels forming a label stack, and wherein the first MPLS router examines the label stack to identify received packets as being forwarded over the secondary LSP and to ascertain how to forward the packets over the primary LSP.

6. The apparatus of claim 1 wherein the second MPLS router adds a plurality of labels to packets being forwarded over the secondary LSP, the plurality of labels forming a label stack, and wherein the first MPLS router is capable of examining the label stack to identify received packets as being forwarded over the secondary LSP and to ascertain whether the second MPLS router is located at the termination point of the secondary LSP.

7. A method comprising the steps of:
   receiving by a first MPLS router packets from a secondary LSP, the packets being sent to the first MPLS router from a second MPLS router that forwards packets over the secondary LSP in response to an event indicating that the secondary LSP should be used instead of a primary LSP;
   forwarding by the first MPLS router the packets on the secondary LSP if the first MPLS router is not located at the termination point of the secondary LSP, and forwarding by the first MPLS router the packets on the primary path if the first MPLS router is located at the termination point of the secondary LSP.

8. The method of claim 7 wherein the second MPLS router adds a first label to packets being forwarded over the secondary LSP, and wherein the step of receiving by a first MPLS router comprises the step of examining the first label to identify received packets as being forwarded over the secondary LSP.

9. The method of claim 8 wherein the second MPLS router adds a second label to packets being forwarded over the secondary LSP, and wherein the step of forwarding by the first MPLS router comprises the step of examining the second label to determine whether the first MPLS router is located at the termination point of the secondary LSP.

10. The method of claim 7 wherein the second MPLS router adds a second label to packets being forwarded over the secondary LSP, and wherein the step of forwarding by the first MPLS router comprises the step of examining the second label to ascertain how to forward the packets over the primary LSP.

11. The method of claim 7 wherein the second MPLS router adds a plurality of labels to packets being forwarded over the secondary LSP, the plurality of labels forming a label stack, and wherein the step of receiving by the first MPLS router includes the step of examining the label stack to identify received packets as being forwarded over the secondary LSP, and wherein the step of forwarding by the first MPLS router includes the step of examining the label stack to ascertain how to forward the packets over the primary LSP.

12. The method of claim 7 wherein the second MPLS router adds a plurality of labels to packets being forwarded over the secondary LSP, the plurality of labels forming a label stack, and wherein the step of receiving by the first MPLS router includes the step of examining the label stack to identify received packets as being forwarded over the secondary LSP, and wherein the step of forwarding by the first MPLS router includes the step of examining the label stack to ascertain whether the second MPLS router is located at the termination point of the secondary LSP.

13. Apparatus comprising:
a first MPLS router capable of forwarding packets over a primary LSP;
the first MPLS router capable of forwarding packets over a secondary LSP in response to an event indicating that the secondary LSP should be used instead of the primary LSP;
a second MPLS router capable of receiving packets and identifying the packets as being received from the secondary LSP;
the second MPLS router capable of forwarding the packets received from the secondary LSP on the primary LSP if the second MPLS router is located at the termination point of the secondary LSP, or of forwarding the packets received from the secondary LSP on the secondary LSP if the second MPLS router is not located at the termination point of the secondary LSP.

14. The apparatus of claim 13 wherein the first MPLS router adds a first label to packets being forwarded over the secondary LSP, and wherein the second MPLS router is capable of identifying the packets as being received over the secondary LSP by examining the first label to identify received packets as being forwarded over the secondary LSP.

15. The apparatus of claim 14 wherein the first MPLS router adds a second label to packets being forwarded over the secondary LSP, and wherein the second MPLS router examines the label to ascertain whether the second MPLS router is located at the termination point of the secondary LSP.

16. The apparatus of claim 14 wherein the first MPLS router adds a second label to packets being forwarded over the secondary LSP, and wherein the second MPLS router examines the label to ascertain how to forward packets over the primary LSP.

17. The apparatus of claim 13 wherein the first MPLS router adds a plurality of labels to packets being forwarded over the secondary LSP, the plurality of labels forming a label stack, and wherein the second MPLS router examines the label stack to identify received packets as being received from the secondary LSP and to ascertain whether the second MPLS router is located at the termination point of the secondary LSP.

18. The apparatus of claim 13 wherein the first MPLS router adds a plurality of labels to packets being forwarded over the secondary LSP, the plurality of labels forming a label stack, and wherein the second MPLS router examines the label stack to identify received packets as being received from the secondary LSP and to ascertain how to forward packets over the primary LSP.

19. The apparatus of claim 13 wherein the event is a link failure on the primary LSP, and wherein the secondary LSP traverses the link failure.

20. A method comprising the steps of:
forwarding packets by a first MPLS router over a primary LSP;
forwarding packets by the first MPLS router over a secondary LSP in response to an event indicating that the secondary LSP should be used instead of the primary LSP;
receiving packets by a second MPLS router and identifying the packets as being received from the secondary LSP;
forwarding by the second MPLS router the packets received from the secondary LSP on the primary LSP if the second MPLS router is located at the termination point of the secondary LSP, or forwarding by the second MPLS router the packets received from the secondary LSP on the secondary LSP if the second MPLS router is not located at the termination point of the secondary LSP.

21. The method of claim 20 further comprising the step of adding by the first MPLS router a first label to packets being forwarded over the secondary LSP, and wherein the second MPLS router identifies the packets as being received over the secondary LSP by examining the first label to identify received packets as being forwarded over the secondary LSP.

22. The method of claim 21 further comprising the step of adding by the first MPLS router a second label to packets being forwarded over the secondary LSP, and wherein the second MPLS router ascertains whether the second MPLS router is located at the termination point of the secondary LSP by examining the second label.

23. The method of claim 21 further comprising the step of adding by the first MPLS router a second label to packets being forwarded over the secondary LSP, and wherein the second MPLS router ascertains how to forward packets over the primary LSP by examining the second label.

24. The method of claim 20 further comprising the step of adding by the first MPLS router a plurality of labels to packets being forwarded over the secondary LSP, the plurality of labels forming a label stack, and wherein the second MPLS router examines the label stack to identify received packets as being received from the secondary LSP and to ascertain whether the second MPLS router is located at the termination point of the secondary LSP.

25. The apparatus of claim 20 further comprising the step of adding by the first MPLS router a plurality of labels to packets being forwarded over the secondary LSP, the plurality of labels forming a label stack, and wherein the second MPLS router examines the label stack to identify received packets as being received from the secondary LSP and to ascertain how to forward packets over the primary LSP.

* * * * *

UNITED STATES PATENT AND TRADEMARK OFFICE
CERTIFICATE OF CORRECTION

| | | |
|---|---|---|
| PATENT NO. | : 7,486,615 B2 | Page 1 of 1 |
| APPLICATION NO. | : 10/351780 | |
| DATED | : February 3, 2009 | |
| INVENTOR(S) | : Andersson et al. | |

It is certified that error appears in the above-identified patent and that said Letters Patent is hereby corrected as shown below:

On the title page of U.S. Patent No. 7,486,615 after the phrase:
"(65)   Prior Publication Data
        US 2003/0152025 A1  Aug. 14, 2003"

insert

--Related U.S. Application Data

(63)   Continuation of application No. 09/378,141, filed on Aug. 20, 1999, now Pat. No. 6,535,481.--

In the Specification
On the first line of U.S. Patent No.: 7,486,615 after "NETWORK DATA ROUTING PROTECTION CYCLES FOR AUTOMATIC PROTECTION SWITCHING"

insert

--CROSS-REFERENCE TO RELATED APPLICATION
This application is a continuation of US Patent Application 09/378,141, filed on August 20, 1999, now U.S. Patent No. 6,535,481.--

Signed and Sealed this
Fourteenth Day of January, 2014

Michelle K. Lee
*Deputy Director of the United States Patent and Trademark Office*